United States Patent
Arumugam et al.

(10) Patent No.: US 9,036,634 B2
(45) Date of Patent: May 19, 2015

(54) MULTICAST ROUTE ENTRY SYNCHRONIZATION

(71) Applicant: LENOVO ENTERPRISE SOLUTIONS (SINGAPORE) PTE. LTD., New Tech Park (SG)

(72) Inventors: Sivakumar Arumugam, Milpitas, CA (US); Chidambaram Bhagavathiperumal, Santa Clara, CA (US); Ashok K. M. Somosundaram, Santa Clara, CA (US)

(73) Assignee: LENOVO ENTERPRISE SOLUTIONS (SINGAPORE) PTE. LTD., New Tech Park (SG)

( * ) Notice: Subject to any disclaimer, the term of this patent is extended or adjusted under 35 U.S.C. 154(b) by 78 days.

(21) Appl. No.: 13/745,623

(22) Filed: Jan. 18, 2013

(65) Prior Publication Data

US 2014/0204938 A1    Jul. 24, 2014

(51) Int. Cl.
   *H04L 12/28* (2006.01)
   *H04L 12/761* (2013.01)

(52) U.S. Cl.
   CPC .................................... *H04L 45/16* (2013.01)

(58) Field of Classification Search
   CPC .......... H04L 12/56; H04L 45/24; H04L 45/58
   USPC ..................... 370/351–360, 390–393, 401
   See application file for complete search history.

(56) References Cited

U.S. PATENT DOCUMENTS

| | | | |
|---|---|---|---|
| 6,169,741 | B1 | 1/2001 | LeMaire et al. |
| 7,522,600 | B1 | 4/2009 | Aggarwal et al. |
| 7,720,066 | B2 | 5/2010 | Weyman et al. |
| 7,765,300 | B2 | 7/2010 | Meehan et al. |
| 2008/0205395 | A1* | 8/2008 | Boddapati et al. ............ 370/390 |
| 2011/0235638 | A1 | 9/2011 | Tempia Bonda |
| 2011/0305239 | A1 | 12/2011 | Chandrashekharachar Suvarneshwar |
| 2012/0027017 | A1 | 2/2012 | Rai et al. |
| 2012/0033668 | A1 | 2/2012 | Humphries |
| 2012/0033672 | A1 | 2/2012 | Page et al. |
| 2012/0113817 | A1 | 5/2012 | Fitzgerald et al. |
| 2013/0003733 | A1* | 1/2013 | Venkatesan et al. .......... 370/390 |
| 2013/0201988 | A1* | 8/2013 | Zhou et al. .................... 370/390 |
| 2014/0204732 | A1 | 7/2014 | Arumugam et al. |

OTHER PUBLICATIONS

Fei. H. et al., "Design and Analysis of Multicasting Experiment Based on PIM-DM", Proceedings of the 2nd IEEE International Conference on Computer Science and Information Technology (ICCSIT '09), 2009, pp. 9-13, IEEE, USA.

Cao, J. et al., "Implementation of Multicast Protocols for High Performance Router", Computer Engineering and Design, May 2008, pp. 2431-2434, 2438, vol. 29, No. 10, People's Republic of China.

(Continued)

*Primary Examiner* — Kevin C Harper

(57) ABSTRACT

Embodiments of the invention relate to synchronizing multicast route entries in a system. One embodiment includes a system with a first module that synchronizes a group membership and sets a router processing flag based on an interface where a packet is received. A second module receives the router processing flag and information based on the synchronized group membership from the first module and creates multicast route entries based on processing the information and the router processing flag even on a non-designated router (DR) interface.

20 Claims, 5 Drawing Sheets

(56) References Cited

OTHER PUBLICATIONS

Fenner, B. et al., "Protocol Independent Multicast—Sparse Mode (PIM-SM): Protocol Specification (Revised) (RFC4601)", Feb. 27, 2007, The Internet Society, USA.

Savola, P. et al., "Host Threats to Protocol Independent Multicast (PIM) (RFC5294)", Aug. 22, 2008, The IETF Trust, USA.

U.S. Non-Final Office Action for U.S. Appl. No. 13/745,636 mailed Jul. 11, 2014.

* cited by examiner

“MULTICAST ROUTE ENTRY SYNCHRONIZATION

BACKGROUND

The present invention relates to network switches and switching, and more particularly, this invention relates to multicast route entry synchronization in a virtual link aggregation group (VLAG) topology.

In a data center comprising one or more access switches, each access switch connects two aggregation switches for redundancy. Link aggregation uses available bandwidth across a switch boundary at an aggregation layer.

BRIEF SUMMARY

Embodiments of the invention relate to synchronization of multicast route entries in a virtual link aggregation group (vLAG) topology. One embodiment comprises a system including a first module that synchronizes a group membership and sets a router processing flag based on an interface that receives a packet. A second module receives the router processing flag and information based on the synchronized group membership from the first module and creates multicast entries based on processing the information and the router processing flag even on a non-designated router (DR) interface.

Another embodiment comprises a non-transitory computer-useable storage medium for synchronization of entries over a link aggregation group (LAG). The computer-useable storage medium has a computer-readable program. The program upon being processed on a computer causes the computer to implement: processing a packet received by a first module, wherein processing comprises synchronizing a group membership and setting a router processing flag; transmitting the router processing flag and information based on the synchronized group membership to a second module; creating multicast route entries by the second module based on processing the information and the router processing flag even on a non-designated router (DR) interface, which synchronizes the entries between a primary switch and a secondary switch.

One embodiment comprises a method that includes transmitting a packet to a first module. The packet is processed by the first module by synchronizing a group membership and setting a router processing flag. The router processing flag and information based on the synchronized group membership are transmitted to a second module. Multicast route entries are created by the second module based on processing the information and the router processing flag even on a non-designated router (DR) interface. An interface list including the entries is transmitted between a primary switch and a secondary switch.

Other aspects and embodiments of the present invention will become apparent from the following detailed description, which, when taken in conjunction with the drawings, illustrate by way of example the principles of the invention.

DETAILED DESCRIPTION

Figure 1:
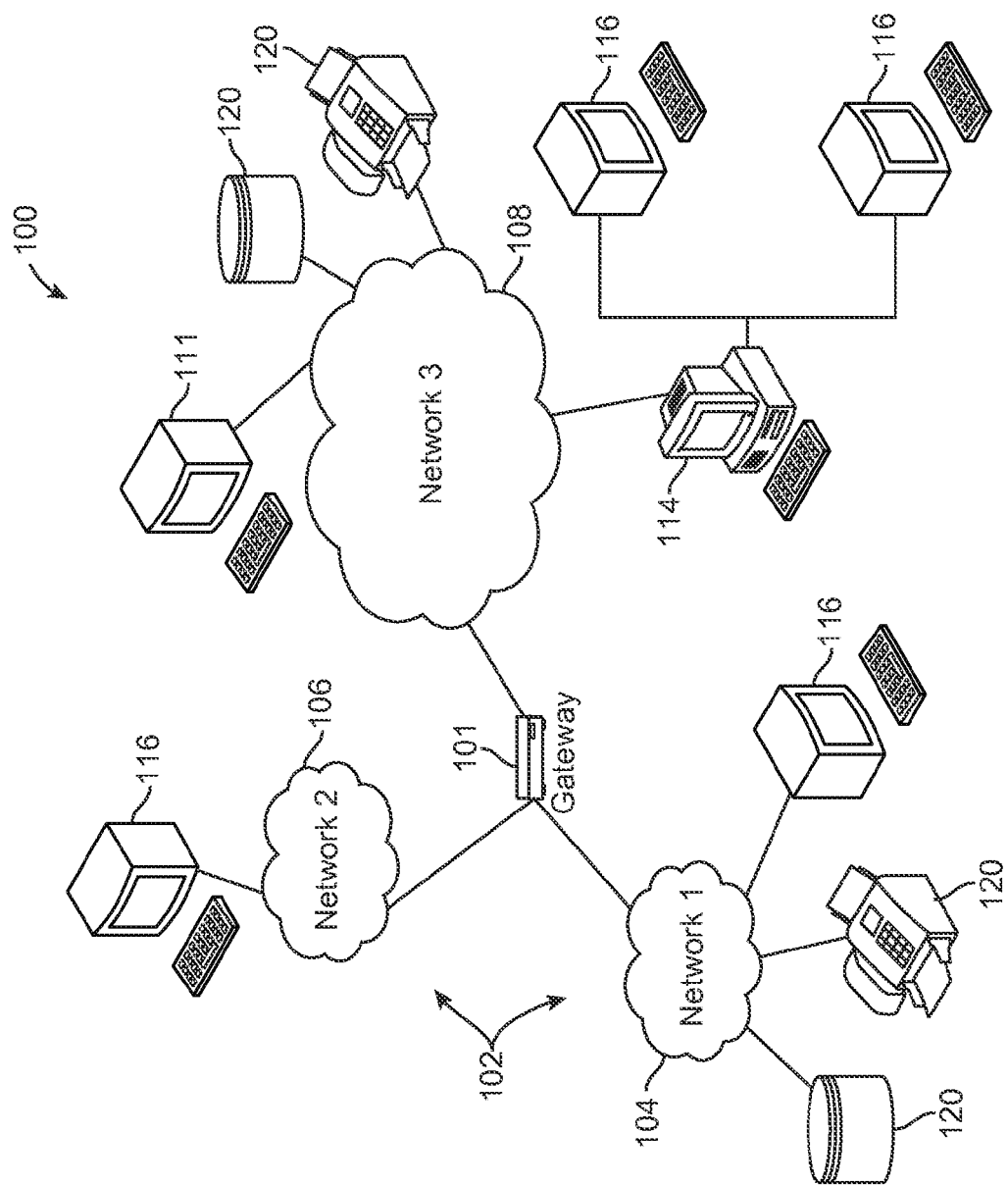
FIG. 1 is a network architecture, in accordance with one embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to the drawings, FIG. 1 illustrates a network architecture 100, in accordance with one embodiment. As shown in FIG. 1, a plurality of remote networks 102 are provided, including a first remote network 104 and a second remote network 106. A gateway 101 may be coupled between the remote networks 102 and a proximate network 108. In the context of the present network architecture 100, the networks 104, 106 may each take any form including, but not limited to, a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods, and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In other examples, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, therefore allowing access and distribution of services across many computing systems. Cloud computing typically involves an Internet connection between the systems operating in the cloud, but other techniques of connecting the systems may also be used, as known in the art.

Figure 2:
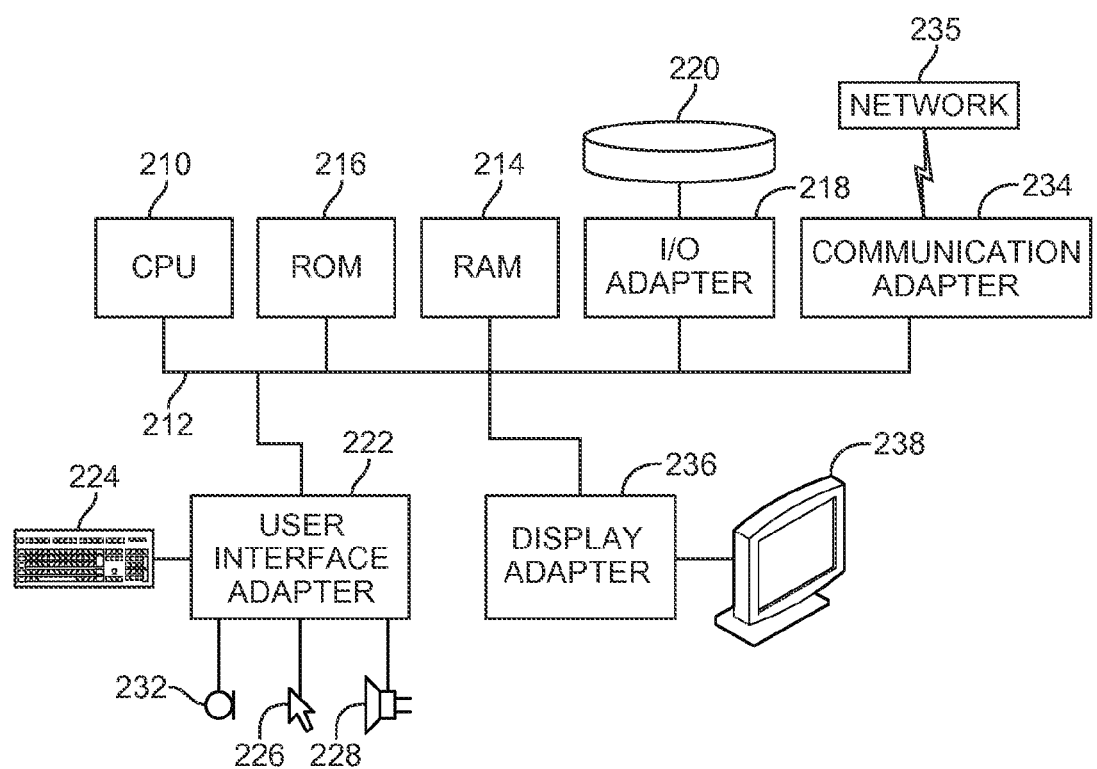
FIG. 2 shows a representative hardware environment that may be associated with the servers and/or clients of FIG. 1, in accordance with one embodiment of the invention.

FIG. 2 shows a representative hardware environment associated with a user device 116 and/or server 114 of FIG. 1, in accordance with one embodiment. In one example, a hardware configuration includes a workstation having a central processing unit 210, such as a microprocessor, and a number of other units interconnected via a system bus 212. The workstation shown in FIG. 2 may include a Random Access Memory (RAM) 214, Read-Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen, a digital camera (not shown), etc., to the bus 212, communication adapter 234 for connecting the workstation to a communication network 235 (e.g., a data processing network), and a display adapter 236 for connecting the bus 212 to a display device 238.

In one example, the workstation may have resident thereon an operating system such as the MICROSOFT WINDOWS Operating System (OS), a MAC OS, a UNIX OS, etc. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

According to an embodiment of the invention, a system includes a first module that synchronizes a group membership and sets a router processing flag based on an interface in which a packet is received. A second module receives the router processing flag and information based on the synchronized group membership from the first module and creates multicast route entries based on processing the information and the router processing flag even on a non-designated router (DR) interface. In this embodiment, the multicast entries are created with the same outgoing interface list for both the primary switch and the secondary switch, which synchronizes the primary and secondary switches, and the first module may transmit the router processing flag and information based on the synchronized group membership to the second module.

Figure 3:
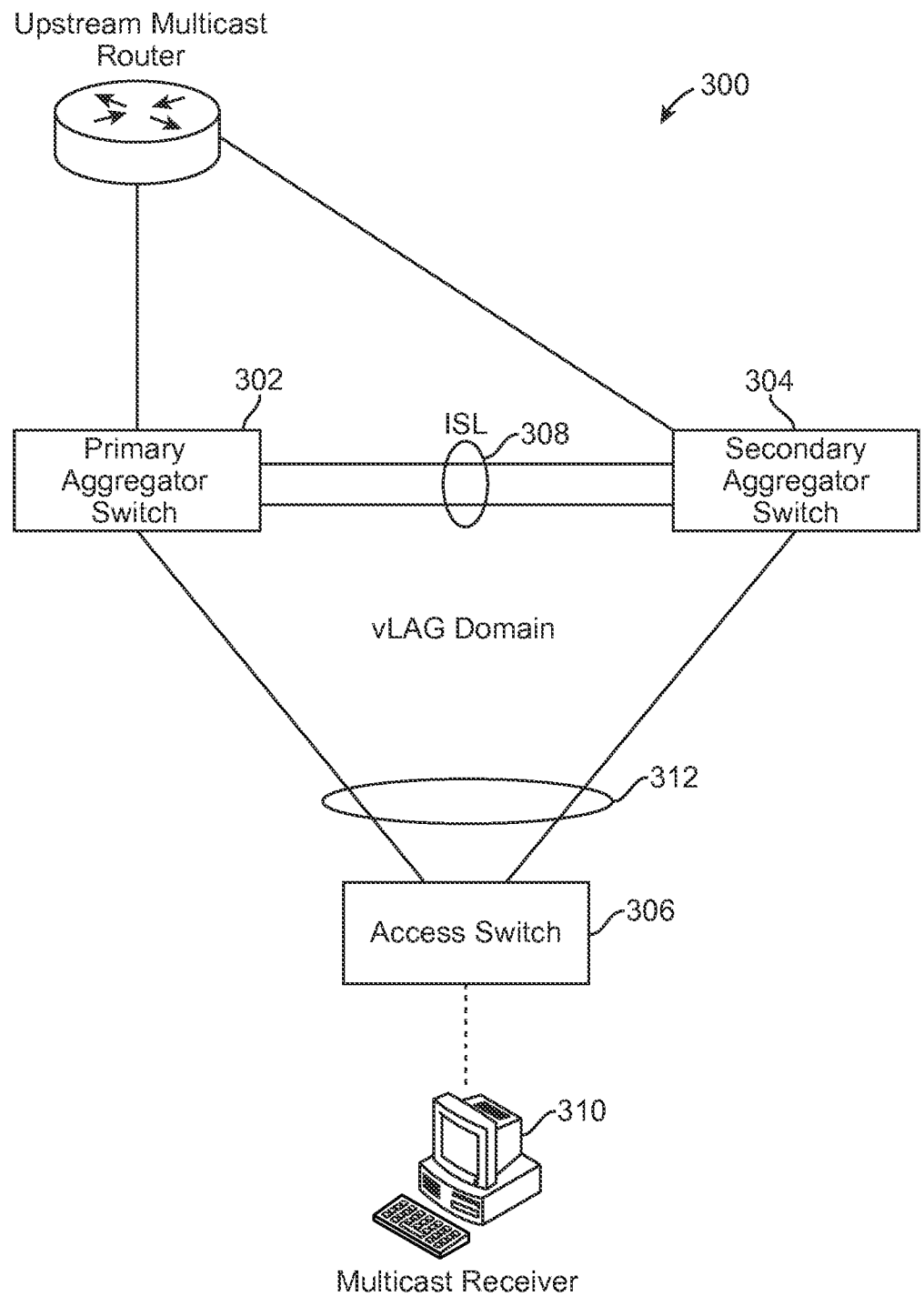
FIG. 3 is a diagram of an example data center system, in which an embodiment of the invention may be implemented.

FIG. 3 is a diagram of an example data center system 300, in which an embodiment of the invention may be implemented. Each access switch 306 is connected to two aggregation switches for redundancy, for example, primary swatch 302 and secondary switch 304. VLAG is a feature that uses all available bandwidth without sacrificing redundancy and connectivity. Link aggregation is extended by vLAG across the switch boundary at the aggregation layer. Therefore, an access switch 306 has all uplinks in a LAG 312, while the aggregation switches 302, 304 cooperate with each other to maintain this vLAG.

Since vLAG is an extension to standard link aggregation, layer 2 and layer 3 features may be supported on top of vLAG. In the system 300 shown in FIG. 3, both primary aggregator switch 302 and secondary aggregator switch 304 have Internet Group Management Protocol (IGMP) snooping enabled. When the Internet Protocol (IP) multicast receiver 310 connected to the access switch 306 sends an IGMP report in a packet, the packet is forwarded to only one of the aggregator switches (either primary 302 or secondary 304) and an IP multicast group entry will be created in the switch in which the packet is sent.

In conventional methods, synchronization of these multicast group entries are achieved via special synchronization packets sent between the peer devices (primary switch 302 and secondary switch 304) using an inter-switch link (ISL) 308, which adds a latency to the traffic flow through the system 300.

Figure 4:
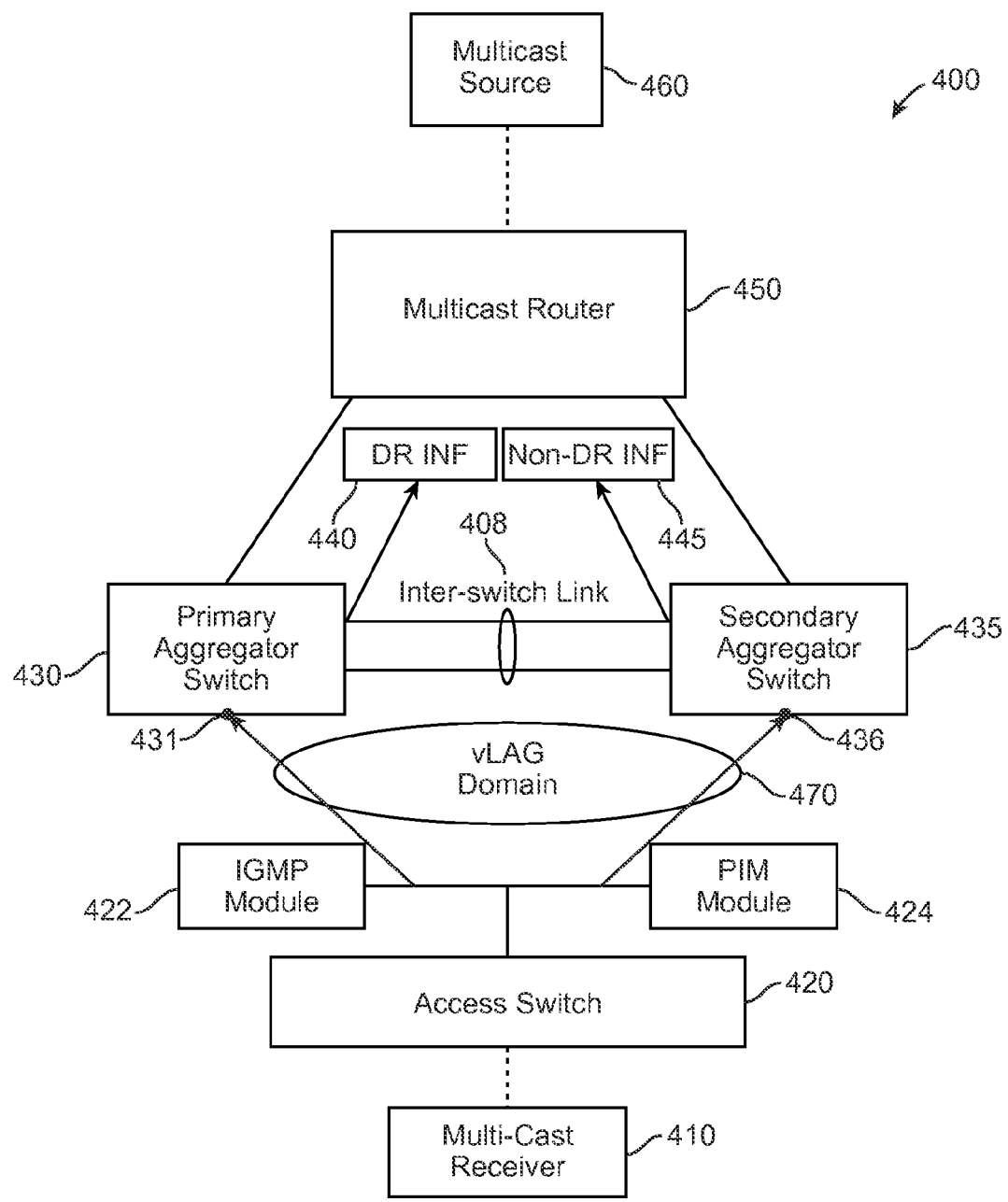
FIG. 4 is a block diagram of a system, according to one embodiment of the invention.

FIG. 4 shows a system 400, such as a data center, according to one embodiment of the invention. In the system 400, all internet group management protocol (IGMP) packets are received by access switch or device 420 from a multicast receiver 410. In one embodiment, the access switch transmits an IGMP report packet either toward the primary aggregator switch 430 or the secondary aggregator switch 435, where the IGMP report packet is processed by an IGMP module 422 and synchronizes the groups to the peer switch. In one example, the IGMP module and the protocol independent multicast (PIM) module 424 may be disposed: within the access switch 420, external to and coupled with the access switch 420, etc.

In one embodiment, the IGMP module 422 processes the IGMP report packet, synchronizes an IGMP group membership, and sets a router processing flag. In one example, the router processing flag is a designated router (DR) flag and is set to TRUE or FALSE based on whether the IGMP report is received on a vLAG or non-vLAG interface. In one embodiment, an indication/information regarding the synchronized IGMP group membership and the router processing flag setting is transmitted to the PIM module 424 from the IGMP module 422. In one example, when the router processing flag is set to TRUE, the PIM module 424 will process the IGMP membership indication even though the interface is the Non-DR router interface 445 for the secondary aggregator switch 435 as the PIM module 424 recognizes that the IGMP packet was received on a vLAG port (e.g., vLAG port 431 or vLAG port 436). In another example, upon the router processing flag being set to TRUE, communication is provided via the DR router interface 440 of the primary aggregator switch 430.

In one embodiment, the PIM module 424 creates multicast route entries by processing the IGMP membership indication based on the router processing flag, and the PIM module 424, which is not supported to create the multicast route entries as per the PIM protocol on non-DR interface, creates the multicast route entries only when the router processing flag is set. In one example, the access switch 420 using the IGMP module 422 and the PIM module 424 sends packets out on a first virtual LAG (vLAG) link in the vLAG domain 470, which corresponds to vLAG port 431 or to a second vLAG link in the vLAG domain 470 that corresponds to vLAG port 436.

In one embodiment, the primary aggregator switch 430 and the secondary aggregator switch 435 provide redundant connections between the multicast receiver 410 and the upstream multicast router 450 and the multicast source 460, The primary aggregator switch 430 and the secondary aggregator switch 435 may allow multiple Ethernet links to be split across multiple switches, preventing any single point of failure and additionally allowing all switches to be load-balanced across the primary aggregation switch 430 and the secondary aggregator switch 435 from the access switch 420.

In one embodiment, when the primary aggregator switch 430 and/or the secondary aggregator switch 435 receive an IGMP packet from one or more virtual link aggregation group (vLAG) ports (such as vLAG port 430 or vLAG port 435), a source media access control (MAC) address of the received IGMP packet may be modified to be a switch MAC address of the aggregator switch associated with the vLAG port on which the IGMP packet was received and the IGMP packet is forwarded to an ISL 408 port.

The last byte (LSB) of the source MAC address includes a trunk identifier (for the vLAG port) and/or trunk ID information for the vLAG port on which the IGMP packet was received. In one example, this trunk identifier may be used to program the receiver vLAG trunk identifier on the peer switch for data forwarding. In another example, IGMP reports received on non-vLAG ports are not modified.

In one embodiment, no ISL 408 communication is required in order to synchronize the entries associated with the IGMP report, and an IP multicast group entry no longer needs to be explicitly synchronized by separate switch processing between the primary switch 430 and the secondary switch 435.

Figure 5:
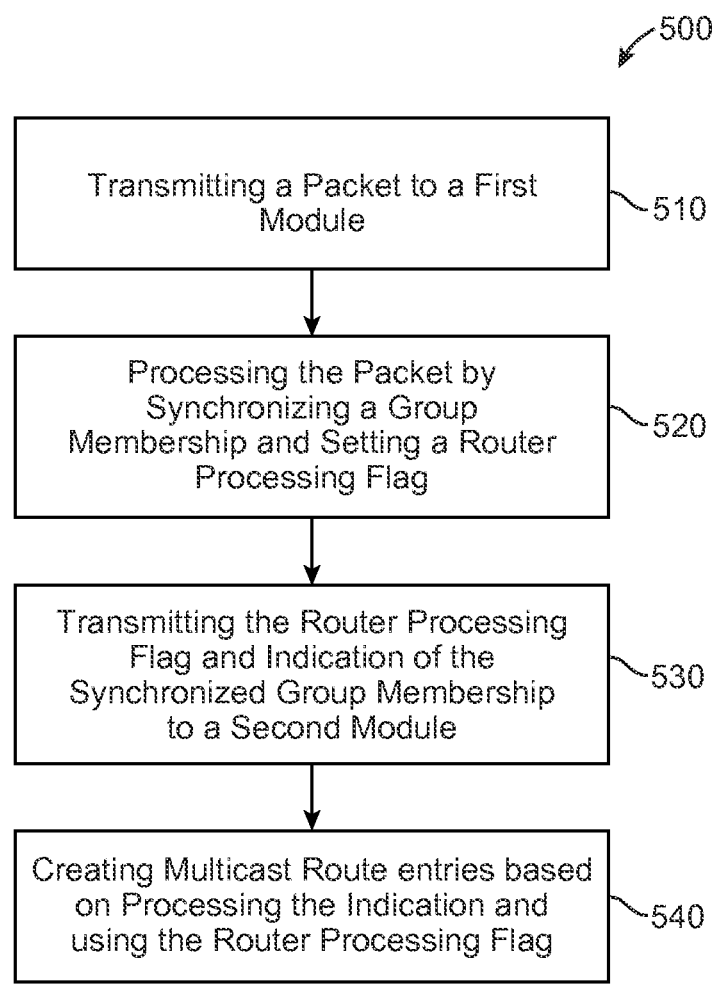
FIG. 5 is a block diagram showing a process for multicast entry synchronization on a vLAG topology, in accordance with an embodiment of the invention.

FIG. 5 shows a block diagram of a process 500 for vLAG entry synchronization, according to one embodiment. Process 500 may be performed in accordance with any of the environments depicted in FIGS. 1-4 among others, in various embodiments. Each of the blocks 510-550 of process 500 may be performed by any suitable component of the operating environment. In one example, process 500 may be partially or entirely performed by an aggregator switch, an IGMP module, a PIM module, etc.

As shown in FIG. 5, in process block 510, a packet is transmitted to a first module, for example, from an access switch (e.g., access switch 420), or a multicast receiver, such as multicast receiver 410. In one embodiment, the packet includes an IGMP report and the first module may be an IGMP module, such as IGMP module 422. In process block 520, the packet is processed by the first module, synchronizes a group membership (e.g., IGMP membership), and sets a router processing flag (e.g., to TRUE or FALSE). In one embodiment, in processing block 530, the router processing flag and information based on the synchronized group membership are transmitted to a second module, such as PIM module 424. In processing block 540, the second module creates multicast route entries based on processing the information and the router processing flag.

In one embodiment, if the incoming packet (e.g., IGMP report) arrives on a vLAG port and the router processing flag is set to TRUE on a non-DR interface 445, the packet is processed, and the multicast route entries are created in the secondary switch 435. Thus, the entries are synchronized between the first switch and the second switch without requiring inter-switch processing for entry synchronization.

According to various embodiments, the process 500 may be performed by a system, computer, or some other device capable of executing commands, logic, etc., as would be understood by one of skill in the art upon reading the present descriptions.

According to the embodiments and approaches described herein, there is no need for an inter-switch synchronization mechanism for IP multicast group entries. Additionally, there is no special processing required for these packets at the peer node or switch (other than recognizing that the packet is received on a vLAG port and processing the packet accordingly).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart, illustration, and combinations of blocks in the block diagrams and/or flowchart illustration; can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system, comprising:
a first module that synchronizes a group membership and sets a router processing flag for an interface in which a packet is received, wherein the group membership comprises a primary switch with protocol independent multicast (PIM) enabled and a secondary switch with PIM enabled; and
a second module that receives the router processing flag and information based on the synchronized group membership from the first module, and creates multicast route entries based on processing the information and the router processing flag even on a non-designated router (DR) interface, wherein PIM protocol DR functionality is extended to synchronize the multicast route entries on both of the primary switch and the secondary switch.

2. The system of claim 1, wherein the system comprises a virtual link aggregation group (VLAG) topology system.

3. The system of claim 2, wherein the packet comprises an Internet group management protocol (IGMP) update report.

4. The system of claim 3, wherein the first module comprises an IGMP module, and the second module comprises a PIM module.

5. The system of claim 4, wherein route entry synchronization is provided to the primary switch and the secondary switch based on receiving the interface list from the PIM module.

6. The system of claim 4, wherein the second module sets the router processing flag for DR interface processing or non-DR interface processing.

7. The system of claim 6, wherein the PIM module processes the information for non-DR interface processing based on recognizing that the packet is received on a vLAG port.

8. A non-transitory computer-useable storage medium for synchronization of entries over a link aggregation group (LAG), the computer-useable storage medium having a computer-readable program, wherein the program upon being processed on a computer causes the computer to implement:
processing a packet received by a first module, wherein processing comprises synchronizing a group membership and setting a router processing flag, wherein the group membership comprises a primary switch with protocol independent multicast (PIM) enabled and a secondary switch with PIM enabled;
transmitting the router processing flag and information based on the synchronized group membership to a second module;
creating multicast route entries by the second module based on processing the information and the router processing flag even on a non-designated router (DR) interface which synchronizes the multicast route entries between the primary switch and the secondary switch, wherein PIM protocol DR functionality is extended to synchronize the multicast route entries on both of the primary switch and the secondary switch.

9. The program of claim 8, wherein synchronization is provided in a virtual link aggregation group (VLAG) topology.

10. The program of claim 9, wherein the packet comprises an Internet group management protocol (IGMP) update report, the first module comprises an IGMP module, and the second module comprises a protocol independent multicast (PIM) module.

11. The program of claim 10, wherein route entry synchronization is provided to the primary switch and the secondary switch based on receiving the interface list.

12. The program of claim 11, wherein setting the router processing flag comprises setting the router processing flag for DR interface processing or non-DR interface processing.

13. The program of claim 12, wherein the PIM module processes the information for non-DR interface processing based on recognizing that the packet is received on a vLAG port.

14. A method, comprising:

transmitting a packet to a first module;

processing the packet by the first module comprising synchronizing a group membership and setting a router processing flag, wherein the group membership comprises a primary switch with protocol independent multicast (PIM) enabled and a secondary switch with PIM enabled;

transmitting the router processing flag and information based on the synchronized group membership to a second module;

creating multicast route entries by the second module based on processing the information and the router processing flag even on a non designated router (DR) interface, wherein PIM protocol DR functionality is extended to synchronize the multicast route entries on both of the primary switch and the secondary switch; and transmitting an interface list including the multicast entries between the primary switch and the secondary switch.

15. The method of claim 14, wherein synchronizing is provided in a virtual link aggregation group (VLAG) topology.

16. The method of claim 15, wherein the packet comprises an Internet group management protocol (IGMP) update report.

17. The method of claim 16, wherein the first module comprises an IGMP module, and the second module comprises a PIM module.

18. The method of claim 17, wherein route entry synchronization is provided to the primary switch and the secondary switch based on receiving the interface list.

19. The method of claim 18, wherein setting the router processing flag comprises setting the router processing flag for DR interface processing or non-DR interface processing.

20. The method of claim 19, wherein the PIM module processes the information for non-DR interface processing based on recognizing that the packet is received on a vLAG port.

* * * * *